United States Patent [19]
Stein

[11] 3,802,109
[45] Apr. 9, 1974

[54] FISH HARVESTER MEANS

[76] Inventor: Julian Stein, 338 Fairway Dr., Franklin Square, N.Y.

[22] Filed: Jan. 31, 1972

[21] Appl. No.: 221,872

[52] U.S. Cl. .............................................. 43/17.1
[51] Int. Cl. ............................................ A01k 79/00
[58] Field of Search ............................. 43/17.1, 4.5

[56] References Cited
UNITED STATES PATENTS

| | | | |
|---|---|---|---|
| 2,832,168 | 4/1958 | Brown | 43/17.1 |
| 3,414,873 | 12/1968 | Richard et al. | 43/17.1 X |
| 3,307,285 | 3/1967 | Wells | 43/4.5 |
| 3,683,356 | 8/1972 | D'Amore | 43/17.1 X |
| 2,745,205 | 5/1956 | Kafka | 43/17.1 |
| 3,005,280 | 10/1961 | Vang | 43/4.5 |
| 3,110,978 | 11/1963 | Kreutzer | 43/4.5 |
| 3,478,460 | 11/1969 | Kimble et al. | 43/4.5 |
| 3,508,358 | 4/1970 | Lee | 43/17.1 X |

Primary Examiner—Hugh R. Chamblee
Attorney, Agent, or Firm—James P. Malone

[57] ABSTRACT

Fish attracting devices are used to attract fish to the vicinity of a trap. Fish repelling devices are located adjacent to a trap to drive fish into the trap. The attracting and repelling devices are arrays of directional sensation producing devices including sonic, pressure and light or combinations of them. The repelling devices may include electrical projectors. Means are provided to sequence the operation of the devices and/or arrays. The attracting and repelling devices may be wave powered.

18 Claims, 26 Drawing Figures

FISH HARVESTER MEANS

This Application is an improvement of my co-pending application, Ser. No. 9,539, filed Feb. 9, 1970, for FISHING TRAP now U.S. Pat. No. 3,638,346 and my U.S. Pat. No. 3,494,064, for FISHING TRAP.

My prior patent and application describe fishing traps. The present application is directed to means to drive or herd the fish into a trap. Spaced arrays of sensation producing devices are provided to project sonic, pressure, electrical, or light sensations or a combination of them. It is well known that fish are sensitive to these sensations. Control means are provided to sequence the operation of the projectors so as to drive or herd the fish in the direction of and into the trap.

Accordingly, the principal object of the invention is to provide new and improved fish harvester means.

Another object of the invention is to provide new and improved means to attract fish.

Another object of the invention is to provide new and improved fish harvester means to drive or herd fish into a trap.

Another object of the invention is to provide new and improved fish harvester means to project sensations to which the fish are sensitive, such as sound, pressure, electricity or light, or combinations of them.

Another object of the invention is to provide new and improved drive means for driving fish comprising arrays of fish repelling projectors.

Another object of the invention is to provide new and improved attraction means for attracting fish comprising arrays of fish attracting projectors and means for sequencing the operation of said devices.

Another object of the invention is to provide new and improved drive means for driving fish comprising arrays of fish repelling projectors and means for sequencing the operation of said device and/or arrays to progressively drive the fish to the trap.

Another object of the invention is to provide new and improved methods of driving fish towards or adjacent to barriers which limit or confine their movement.

Another object of the invention is to provide new and improved methods of driving fish into areas of increased confinement.

Another object of the invention is to provide new and improved methods of trapping fish by driving them beyond a collapsed barrier and then erecting the barrier as a means of increasing confinement.

Another object of the invention is to provide new and improved methods of automatically or semi-automatically herding fish into confined areas for storage or for removal.

Another object of the invention is to provide new and improved methods to herd or direct fish by driving them towards or adjacent to barriers which confine their movement.

Another object of the invention is to provide means to increase the confinement of the herded fish by driving them into increasingly confined areas and by further increasing their confinement by erecting physical barriers or applying repelling device barriers.

Another object of the invention is to provide new and improved methods of using configured patterns of repelling devices to harvest fish from the surface area, the bottom area, the shore area, or from an area adjacent to the shore or an area bounded by the surface and the bottom.

Another object of the invention is to provide new and improved methods of herding or driving fish over a prescribed path which may include straight sections, turns and transitions.

Another very important object of the invention is to help protect our ecology, provide clear lake waters and better sports fishing at many of our lakes. This can be indirectly accomplished by mass harvesting of bottom fish such as the carp.

The carp problem was outlined in an article printed on the front page of the Wall Street Journal of May 18, 1971. Referring to Beaver Dam Lake, Wisconsin as an example, the article states:

"It had been taken over by the carp, an incredibly hardy species whose bottom-rooting feeding habits had turned its waters the color of chocolate milk and killed or driven off the predator game fish who must spot their prey by sight. Also, close to extinction were the fishing resorts that are a mainstay of the local economy".

The article goes on to say,

"in late 1968, the state of Wisconsin treated it with a newly developed chemical that killed its fish population".

The article presents the following comment, "The effort hasn't proceeded without considerable criticism. Arthus Hasler, University of Wisconsin Professor of Zoology, and a specialist in limnology, the study of fresh water bodies, charges that many transplants and chemical treatment projects have been undertaken willy-nilly, without due regard for their possible consequences".

Professor Hasler adds,

"Tinkering with the ecology could prove extremely costly in terms of future food supplies".

The article then quotes Vern Hacker, chief fish biologist for the central region of the state, "A lot of people don't like the idea of killing off the carp the way we do, and I don't either, but it's the best answer we have".

An object of this invention is mass harvesting of carp to restore a natural balance of carp and game fish. This could eliminate the official use of poison in our lakes and provide the carp as food instead.

These and other objects of the invention will be apparent from the following specifications and drawings of which.

Figure 1:
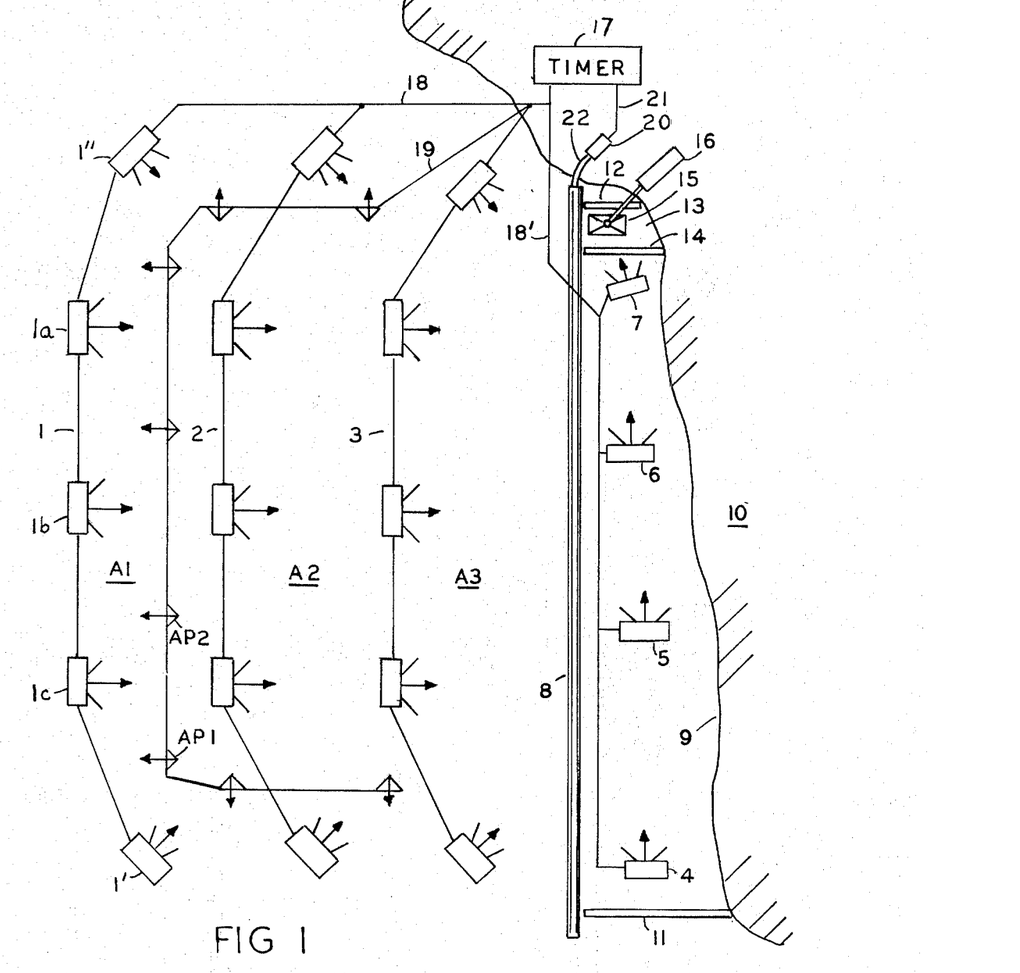
FIG. 1 is a plan view of a fish harvester using sequenced sensation projecting attractors and drivers and an erectable barrier trap.

FIG. 1 shows a fish harvester using sequenced attraction projectors AP1, AP2, etc., sequenced sonic driver arrays 1-3 and an erectable barrier 8. The attraction projectors attract fish into the area. The sonic driver groups 1, 2 and 3 repel the fish towards the barrier 9. The barrier 9 may be man made such as a net, or it may be natural. In this figure the barrier 9 is a section of the shore 10.

The sonic drivers are operated in a sequence as follows:

Driver group 1 repels the fish from area A1 towards the barrier 9. Since fish are quite sensitive to sound and water is an excellent conductor of sound, a major portion of the fish from area A1 will be repelled into area A2 or beyond it. Driver group 1 is the only active group at this time. Therefore, the fish can be expected to swim right past the other sonic drivers which are quiescent. After allowing sufficient time for area A1 to be evacuated, driver group 2 is used to repel the fish out of area A2 towards the barrier 9. The erectable barrier 8 is lying quietly at the bottom. Driver group 3 repels the fish over the collapsed erectable barrier 8. They are blocked from going beyond barrier 9 and tend to be concentrated in the area between barrier 9, and the erectable barrier 8. The erectable barrier is then raised, trapping the fish in the area between the barrier 9, the erectable barrier 8, and the end barriers 11 and 12. The end barriers 11 and 12 may remain in place without raising or lowering. The trapped fish are then driven towards the removal area 13, by the sequence operation of sonic drivers 4, then 5, then 6 and finally 7.

Alternately the erectable barrier may have its top portion held in a fixed elevated position while the bottom portion is raised or lowered. For this application, the barrier is erected as the bottom portion is lowered.

The fish are harvested in batches at the removal area 13 as follows:

Fish are blocked from entering the removal area 13 when the erectable removal barrier 14 is raised. A removal net 15 is lowered to the bottom of the removal area 13 which is essentially clear of fish. The erectable removal barrier 14 is then lowered to the bottom and the sonic drivers repel a batch of fish into the removal area 13. The erectable removal barrier 14 is then raised, trapping the fish in the water above the removal net 15. The removal net is then pulled up by a crane. In this application the crane 16 is located on shore. After depositing the fish on to a truck or other conveyance as required, the crane drops the empty net into the empty removal area 13. The erectable removal barrier is lowered and a new batch of fish is driven into the removal area by the sonic drivers 7. The removal cycle is repeated until most of the fish from area A4, A5, A6 and A7 have been removed.

The erectable barrier 8 is then lowered and the entire process can be repeated starting with driver group 1 repelling a new batch of fish from Area A1.

The fish harvester shown in FIG. 1 and described above would be applicable to a very large fish farm or a large body of water. Since each of the sonic drivers can have a range of hundreds of feet, the configuration shown could cover an area many hundreds of feet long by hundreds of feet wide. The fish farm could be 10 to 100 times as large as the harvesting area shown. Simpler configurations with less drivers can be used for small farm applications and larger extensions can be used for larger areas or ocean fishing. The sonic drivers may be anchored far enough below the surface to avoid any hazard to navigation and the areas A1, A2 and A3 can be open to boats.

It is desirable that the sonic drivers be directional with most of the sound waves directed as the arrow indicates. This type of directional sonic generator must be anchored with the directional pattern as shown. The sound field pattern does not have to be extremely directional however. Since the sequenced operation causes the fish to be in front of the sonic generators when they are on, sound waves in the backward or other directions will generally be directed at areas that have already been evacuated. Thus the sequenced sonic generators could be quite effective even if they had a uniform circular field strength pattern.

Timing and sequencing are performed by the control timer 17, or manual control which delivers electrical on-off control signals to the sonic drivers via cables 18 and 18', to the attraction projectors via cable 19, and to the compressed air supply unit 20 via cable 21. Compressed air is delivered to the erectable barrier 8 via the flex hose 22. Alternately, the timer 17, may also be the System Power Supply. In this case on-off control would be by supplying or not supplying power at the times as determined by the timer portion of the unit. The erectable barrier 14 is similar to erectable barrier 8.

Figures 2, 2A:
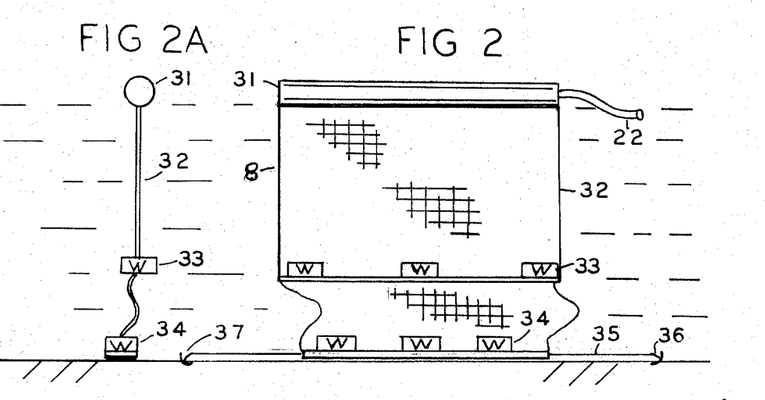
FIGS. 2 and 2A are front and side views of the errectable barrier.

FIGS. 2 and 2A show two views of the erectable barrier 8. When the inflatable tube 31 is partially filled with low pressure air via the flex hose 22, it pulls the net 32 up to the position shown. The net material when it is water soaked is slightly heavier than the water. In addition the light weights, 33 keep the upper portion lightly taut and hanging fairly straight. The lower portion of the net between weights 33 and 34 has extra slack. If the water depth increases this slack will be taken up. When the flex hose is open to normal atmospheric air pressure the water pressure forces the air out via the flex hose and the entire net sinks. The bottom of the net is held in place by the weights 34 and anchor cable 35 which is connected to anchors 36, 37 at each end.

FIG. 1 shows three sonic driver groups 1, 2, and 3. Each of these groups may be viewed as a 5 wide by 1 deep array of projectors 1a, 1b, 1c, 1' and 1'', etc. It is shown symbolically by the symbols of FIG. 1A. The one deep array is located about half way between the surface and the bottom and aimed horizontally. It is particularly suited to applications where the depth is less than several hundred feet. In this case, the surface of the water and the bottom serve as upper and lower limiting barriers. Alternately,, additional arrays similar to the one shown may be located above and below the array shown to form arrays of depth greater than 1. For example, the 5 wide by 1 deep array with a similar array above it and another below it would be described as a 5 wide by 3 deep array.

Similarly the width of an array may be increased or decreased from the 5 wide array shown.

Since there are no barriers on either side of the array (at the width limits) the outer most sonic drivers 1' and 1'' are aimed inwardly. This decreases the loss of fish at the edge of the array. As fish swim near the width limits of the array, the outer most sonic drivers 1' and 1'' direct the fish back towards the center of the array and forward.

BOTTOM FISH HARVESTER

Figure 3:
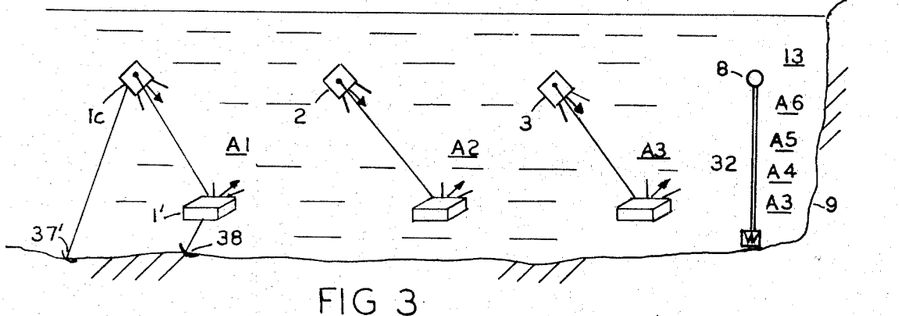
FIG. 3 is a side view of a fish harvester using sequenced driver arrays directed diagonally towards the bottom for harvesting of bottom fish.

FIG. 3 shows a side view of a fish harvester using sequenced sonic arrays 1, 2 and 3 directed diagonally towards the bottom, they are lighter than water and are anchored by anchors 37', 38, etc. This configuration is used to harvest bottom fish such as carp.

The top view of this harvester may be as shown in FIG. 1. The same numbering systems is used in the two figures. In the side view the 5 wide × 1 deep array appears as follows:

The three sonic drivers 1a, 1b and 1c appear as a single driver, 1c with two similar drivers hidden behind it. The two outermost drivers 1' and 1'' appear as one driver 1' with the other driver 1'' hidden behind it. In this application the entire 5 wide × 1 deep array is tilted diagonally downward.

The three inner sonic drivers 1a, 1b and 1c are aimed foward and diagonally down. The outermost sonic drivers 1' and 1'' are aimed forward and tilted inwards towards the center of the array. The fish are directed as the arrows indicate down towards the bottom and forward from area A1 towards the barrier 9 which in this case is the shore. If the fish harvester was located remotely from shore a net barrier would be used. Operation is the same as was described in connection with FIG. 1. The fish are driven from area A1 to A2 to A3 to A4, A5 and A6. They are then driven from A4 to A5 to A6 to the removal area 13. The erectable barriers 8 and 14 operate in the same manner as described previously but they do not have to be extended all the way up to the surface. Most of the fish will be prevented from swimming over the erectable barriers 8 and 14 by the downward component of sound from the sonic generators 1–7 which acts as a sonic barrier keeping them close to the bottom until they are removed by the crane 16, FIG. 1.

Figure 4:
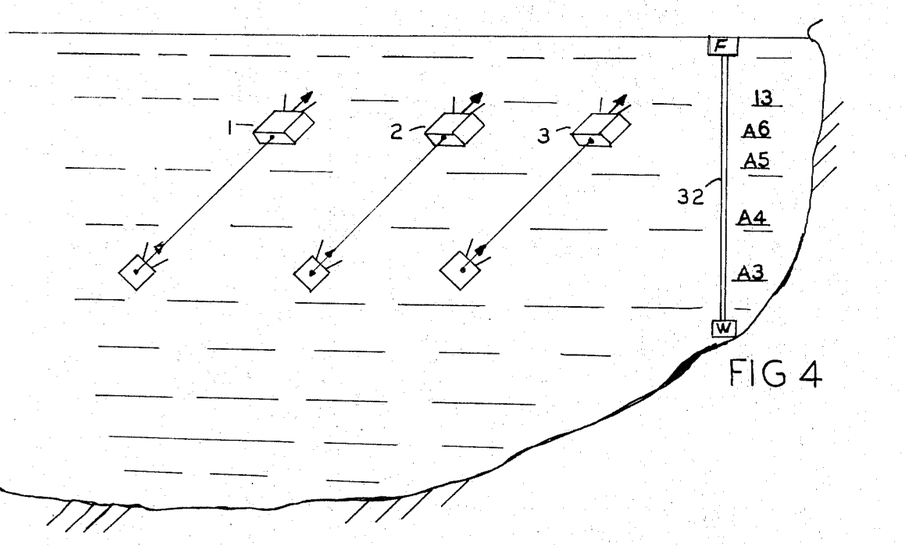
FIG. 4 is a side view of a fish harvester for surface harvesting.

Alternatively the sonic arrays 1, 2 and 3 can be aimed diagonally towards the surface as shown in FIG. 4 for surface fishing. Operation is the same as bottom fishing except for the following:

1. The arrays are tilted diagonally forward and towards the surface.
2. The fish are driven along the surface from areas A1 to A2 to A3 to A4, A5 and A6. They are then driven from A4 to A5 to A6 to the removal area 13 as shown in FIG. 1.

SOUND GENERATORS

The sound generators may be conventional underwater speaker type sound transducers. Alternately they may be high power transducers used in profiling systems. They may be energized by pulses of a sonic or an ultra sonic carrier. The carrier frequency, the pulse repetition rate and pulse width are selected to be attractive to fish at considerable range for attraction projectors or particularly repulsive to fish at considerable range for repulsion drivers. In this application the sound waves from a group of transducers are projected simultaneously. Alternately the individual transducers of an array may be energized in a sequence, the net affect being a gradual movement forward towards the barrier 9.

Figure 5:
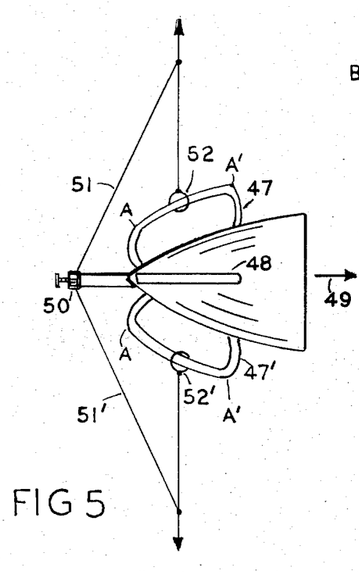
FIG. 5 is a side view of a sonic generator mounting showing adjustment capability for vertical aiming with respect to horizontal plane.

As shown in FIG. 5, the sonic generator has two vertical aiming segment bars, 47 and 47', and two horizontal aiming segment bars 48 and its twin. The four segment bars are identically interchangable parts. They each have an outer section which is a segment of the circumferences of a circle, extending from A to A' and are bent at A and A' to form loops. The clamp ring 50 is clamped with the cable lengths 51 and 51' equal. This holds the vertical aim 49 at zero degrees to the horizontal. To raise the aim vertically, loosen the ring clamp 50 and turn the sonic generator counter-clockwise. As the cable slips through the ring clamp 50 length 51' gets smaller and length 51 gets larger. Ring 52 slips forward on the circumference A–A' and ring 52' slips backward towards point A. At the required vertical aiming angle the ring clamp 50 is clamped and the angle is set. A similar cable configuration connects to the horizontal aiming segment bars. This cable is in a horizontal plane and is stretched between sonic generators or from sonic generators to anchors and/or floats. Thus each sonic generator is held at an established cross point of a vertical and horizontal cable and the vertical and horizontal aiming of each sonic generator can be adjusted and set.

FIGS. 1 – 5 show fish harvester apparatus using sequenced sonic drivers and erectable barriers. Alternately the same functions can be performed using sequenced electrical drivers and/or sequenced light beam drivers in place of or in addition to the sonic drivers. Electrical waves and/or lights flashing at selected repetition rates will also have a repelling affect on fish.

Figure 6:
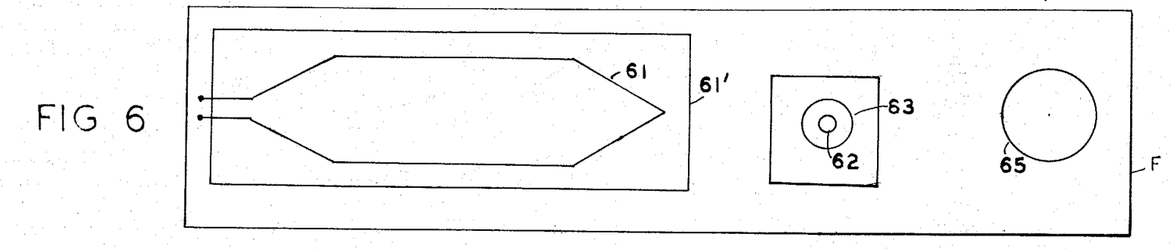
FIGS. 6 and 6A are front and side views of a typical driver group including directional antenna, directional light and sonic transducer.
Figure 6A:
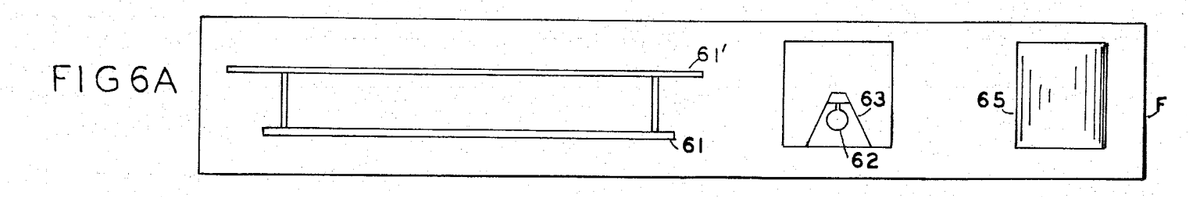

FIGS. 6 and 6A show front and side views of a typical driver group including the rhombic antenna 61 and the reflector 61' of an electrical driver, the lamp 62 and reflector 63 of a flashing light driver and the sound transducer 65 of a sonic driver. These may be mounted on a single frame F.

Figure 7:
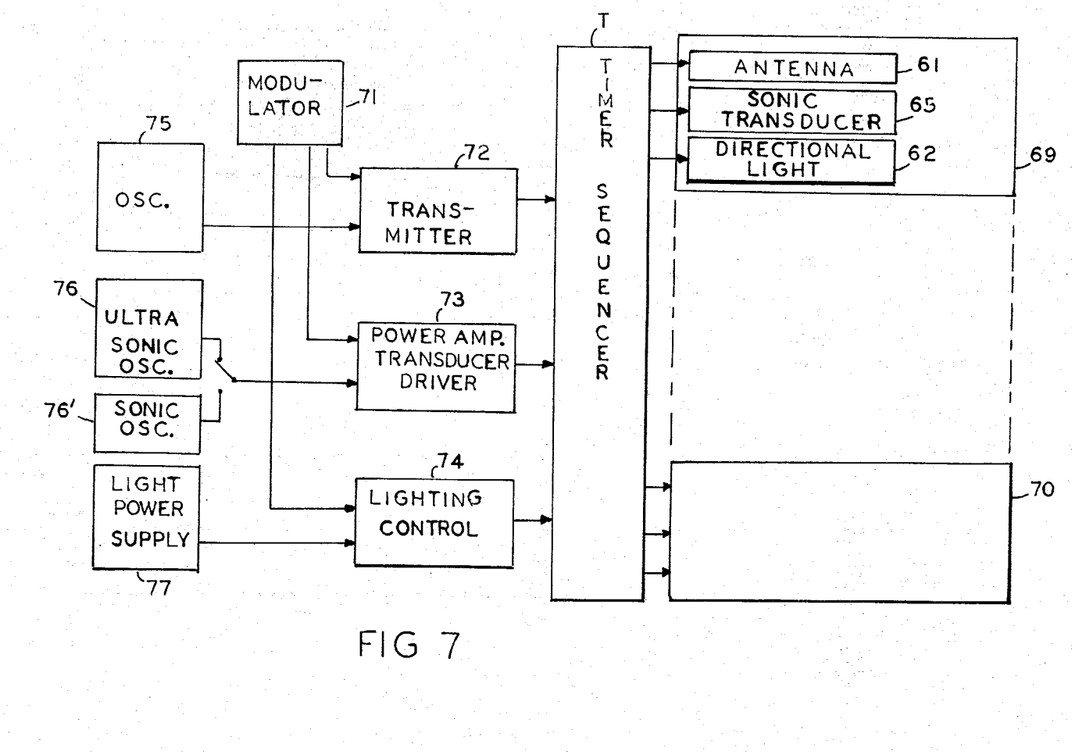
FIG. 7 is a block diagram of a fish repelling system containing a plurality of driver groups time sharing a single modulator, timer-sequencer and energizing equipment.

FIG. 7 shows a block diagram of a fish repelling system containing a plurality of driver groups. Each driver group can repel fish by a combination of sonic repulsion, electric field repulsion, and/or flashing light repulsion. The driver groups 69 and 70,, may be as shown in FIG. 6. The antenna 61 is preferably a rhombic type. The reflector 61', FIG. 6, is located adjacent to its antenna preferably at a distance of 1/4 wavelength of the carrier frequency being transmitted by their respective antennas. The driver groups are used in place of the sonic drivers in FIGS. 1 to 5.

Referring to FIG. 7, the modulator 71, contains an oscillator operating at a basic modulation frequency. The basic modulation frequency may be applied directly to the transmitter 72, the power amplifier/transducer driver 73 and the lighting controller 74 or the basic modulation frequency may be varied by one or more functions to form the three modulation outputs shown. Typical functions used are multiplication up to a harmonic of the basic modulation frequency or dividing down to a submultiple of the basic modulation frequency.

The transmitter 72 receives a carrier signal from the oscillator 75 and an electrical modulation signal from the modulator 71. The electrical modulation signal is equal to the basic modulation frequency times or divided by a factor. The modulated carrier signal is amplified by the transmitter and delivered to one antenna at a time by the timer sequencer T, which may be a time sharing switch means.

The power amplifier/transducer driver 73 receives a sonic or an ultrasonic carrier signal from the ultrasonic oscillator 76 or sonic oscillator 76' and a sonic modulation signal from the modulator 71. The sonic modulation is a direct function of the basic modulation signal. The modulated carrier signal is amplified by the power amplifier/transducer driver 73 and delivered to a sonic or ultrasonic transducer by the timer T. sequencer.

The lighting controller 74, receives a power voltage from the light power supply 77 and a lighting modulation signal from the modulator 71. The lighting modulation signal is a direct function of the basic modulation frequency. The modulated lighting power voltage is delivered to a directional light 62 by the timer sequencer.

The timer sequencer T. selects one driver group at a time and delivers the modulated transmitter signal, the modulated sonic or ultrasonic signal, and the modulated lighting power voltage to it. The driver group is energized for a very brief interval, preferably a few seconds, to repel the fish in front of it in a direction away from the driver group. Referring to FIG. 1, the timer sequencer would first deliver the energizing signals to the driver group of array 1. A typical sequence is:

Upper outer driver group
Lower outer driver group
Upper inner driver group
Lower inner driver group
Center driver group This sequence drives the fish forward and to the center and then forward. The sequence is continuously repeated using the drivers of array FIG. 1. For the 5 × 1 array shown with three seconds per driver group, one cycle would take 15 seconds. After a number of minutes sufficient to repel most of the fish from Area A1, the sequencer would switch from the driver groups of array 1 to the driver groups of array 2 where the same sequence would continue. Thus the driver groups are being used to accomplish the same function as the sonic drivers described. In addition, it is shown, that a plurality of driver groups can time-share a single modulator timer sequencer transmitter, power amplifier/transducer driver, light power supply and lighting controller. Thus a plurality of low cost driver groups can time-share a single set of the more expensive electronic portions of the fish repelling system.

The combined repelling affect of the three types of drivers will have a powerful repelling affect on a wide variety of fish in the area in front of the driver group.

The fish senses the pulsed or modulated electric field and/or the modulated sound. Simultaneously it sees the flashing light. All of these things are strange and frightening. The fish may not be able to sense the direction of the electric field but it will be disturbed by it. The direction of the sound and/or the light is readily apparent. Since all three are modulated by the same source, the fish will sense the regular sequences of their occurrence such as: sound, sound flash, sound sound flash, electric field and will associate them together. The immediate reaction will be to swim away from the light and/or sound. The electric field can be quite light. If the fish can just about sense its presence, it will be disturbed, and alerted to retreat from very slight amounts of light and sound associated with it.

The modulating frequencies of the electric, sound and light fields are each selected for their repelling affect. The repelling frequency ranges may differ but a fixed ratio of the modulating frequencies can be used. A basic modulation frequency related to all three repelling modualtion frequencies is selected. Each of the three modulating frequencies is then derived from the basic modulating frequency.

THE SHORE AND/OR BOTTOM

Various figures show Fish Harvesters located near the surface, the bottom and/or the shore. These fish harvesters make use of these as barriers available in the material terrain. Practice of these inventions is not limited to operation adjacent to the surface, the bottom and/or the shore. If the fish harvester is to be located remote from the surface, the bottom and/or the shore, a net barrier may be used to replace the function performed by the surface, the bottom and/or the shore. Alternately, the surface or the bottom of the shore may be used, as replacements for each other. For example, FIGS. 2 and 3 show the alternate use of the surface or the bottom for similar type fish harvesters. The use of the surface, the bottom and/or the shore can offer extensive savings in net barriers when the fish harvester is located adjacent to them.

DEFINITION OF ARRAY SYMBOLS

Figure 1A:
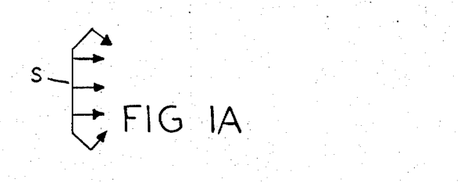
FIG. 1A is a symbolic diagram of a driver array.

FIG. 1A defines the symbols of a 5 wide by 1 deep array. The same symbol may be relabeled 5W×MD to represent a 5 wide by M deep array or it may be labeled NW × 5D to represent and N wide by 5D array. By chaning the number of arrows used in the symbol in addition to the label, a similar symbol may represent an N wide by M deep array. In addition the arrows may be omitted and the label may indicate the width and depth.

TRANSITION ARRAYS

Figure 8:
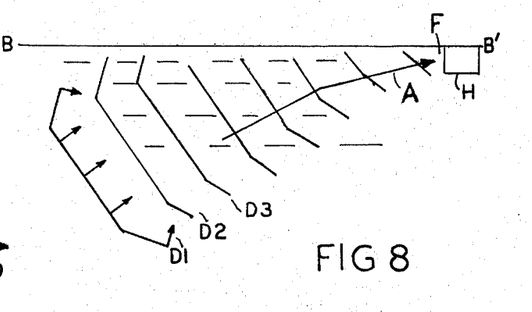
FIG. 8 is a plan view of an intersection type transition array, tapered along a barrier.

Transistion arrays, FIG. 8, are used to change the height, width and/or cross sectional area of a group of arrays. Transition arrays make array groups more suited to the array group location. One very important use of transition arrays is to narrow down the cross section of a group of arrays to suit the narrow or comparatively narrow opening of a fish harvester. These driver arrays can cover very wide cross sectional areas over long lengths of drive. They can therefore harvest fish from extensive volumes of water. A transition array can narrow the cross section to suit a much smaller trap or harvester.

FIG. 8 shows an intersection type transition array. The N wide by M deep array of fish drivers, D1, D2, D3, etc., intersects the barrier plane B—B'. The barrier may be the surface, the bottom (figure inverted) or the shore (top view) or it may be a net barrier. The array is tapered along the intersecting plane B—B'. The fish are held within the array and driven in the general direction of the arrow, A. Since they cannot get through the barrier B—B' almost all of the fish from the array volume are concentrated in a narrow stream at the exit F. A fish harvester H. may be located as shown in FIG. 8 to capture the fish as they exit at F. The harvester H. may be as shown in FIG. 1.

THE INTERSECTION TYPE

Transition array of FIG. 8 may be used together with other barriers in addition to B—B'.

For example, the NW X MD array shown may be directed along the surface, along the bottom, or between the surface and the bottom. It can be tapered by the barrier B—B' which may be the shore or a net barrier.

TURNS AND TRANSITIONS AS PARTS OF A PRESCRIBED PATH

Turns are used to drive fish over a path, prescribed by the shape of an array group. Ability to drive fish over a prescribed path which may include turns adds considerable versatility to the application of driver arrays in harvesting fish. Thus an area may be surveyed and advantageous locations for driving, tapering and catching or harvesting and/or storing the fish alive can be selected. The survey can include such factors as natural fish trails, currents, temperature, salinity, favorable fish environments and available natural barriers such as the surface, the bottom and/or the shore. The presecribed path including turns where required is then selected. This path may include:

A. driving fish from an area that can be expected to be periodically replenished with fish.

B. a path to the selected harvesting area.

C. transitions as required including a final narrowing to match the entrance of a fish trap, fish farm or fish harvester.

IMPLEMENTING TURNS

A. Gradual turn

Figure 9:
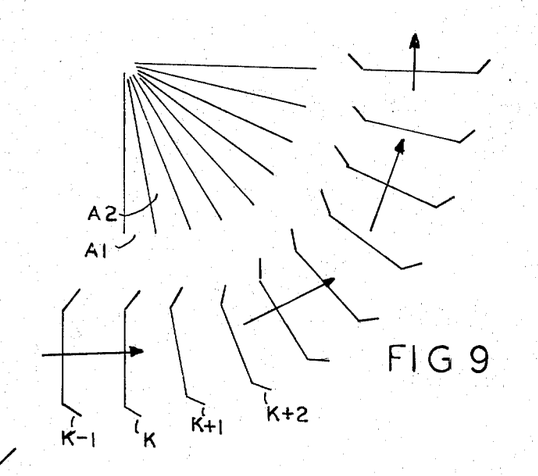
FIG. 9 is a diagram showing a gradual turn by a plurality of array elements.

FIG. 9 shows a gradual turn in an N wide by M deep array group. Each element of this array group is an N wide by M deep array. Elements K—1 and K are the last two elements of a straight (non turning) section of the array path. Element K+1 is at an angle A1 to element K. Element K+2 is at an angle to A2 to Element K+1, etc., the sum of the incremental angles equals the total turn angle. The total turn angle may vary for each individual application. As shown in FIG. 9, eight elements are used for a turn of approximately 90° however, in practice, turns can be implemented with larger angles per array element. The large number of array elements illustrated would be used for a turn with a radius of many hundreds of feets, so that the spacing between array elements can be several hundred feet.

B. Sharp Turn or Abrupt Turn

FIG. 1 shows an abrupt turn aided by the shore barrier 9. Alternately the abrupt turn may be aided by the surface, the bottom or a net barrier.

Figure 10:
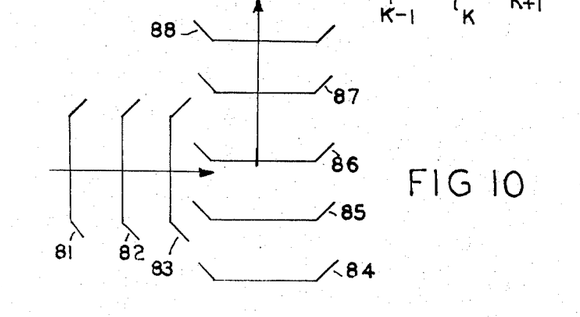
FIG. 10 is a diagram showing arrays for making an abrupt turn.

FIG. 10 shows an abrupt turn implemented without the use of or assistance of a barrier. Array element 81 drives fish beyond element 82. Element 82 drives them beyond element 83. Element 83 drives the fish into the path of another array group 84 – 88, which drives the fish in a new direction 84 to 88.

ARRAY GROUPS

FIGS. 1 to 9 show many different types and configurations of fish driving arrays and array groups composed of a plurality of arrays, each array of the group is referred to as an array element. The many configurations shown indicate the versatility of fish driving array groups. They can be used to drive fish over a prescribed path of considerable cross sectional area, to catch fish from a considerable volume of water. The path can be wide or narrow, curved sharply or gradually. Transitions may widen or narrow the path. Fish may be transferred from one array path to another. In each of the above functions barriers may be used to assist the function and increase the efficiency of the function. Barriers can also be used to decrease the number of fish which may escape. Alternately, each function may be performed without the assistance or need for barriers. The main barriers to be used, where it is advantageous to use them, include the surface, the bottom, the shore and net barriers.

Sonic transducers may be electro acoustic transducers. Electro acoustic transducers may be purchased as standard catalog type items from companies such as Massa Division, Dynamics Corp. of America, and may be the types used in various sonar systems, or marine profiling systems.

TOWED ARRAYS

FIG. 1 shows a fish harvester using sequenced sonic drivers and an erectable barrier trap. Alternately a single array can perform the function of arrays 1, 2 and 3, if the array is towed from location 1 to location 3. The array would then be towed back to location 1. This back and forth towing can be repeated in a cycle such as tow in and drive, return, wait, then repeat. Similarly a single towed driver or 1 X 1 array could replace the sequenced drivers 4,5,6 and 7, FIG. 1.

Similarly, a single towed array can replace a group of sequenced arrays as shown in FIGS. 3 and 4 and FIGS. 9 and 10. In FIG. 10 one towed array replaces arrays 81, 82 and 83, while another towed array replaces the sequenced arrays 84, 85, 86, 87 and 88. Thus towed arrays can be used for off shore fishing as in FIG. 1, bottom fishing as in FIG. 3 and surface fishing as in FIG. 4. Towed arrays can be used for gradual turns as in FIG. 9 and abrupt turns or transfers from one array to another as in FIG. 10.

Towed arrays can be used for transitions. Referring to FIG. 8, a single towed array of longer range than the fixed array elements shown, can replace the array elements. The array is towed through positions D1 to D3. The field of the towed array at location D3 intersects the barrier plane BB' and the fish driven up against the barrier in the direction of the arrow will be directed by the array towards F. in a narrowing transition.

Towing can be by a boat, a motor and cable, or may be energized by water currents.

SIMPLE PROFILE DEFLECTION PLATE

Figures 11, 11A:
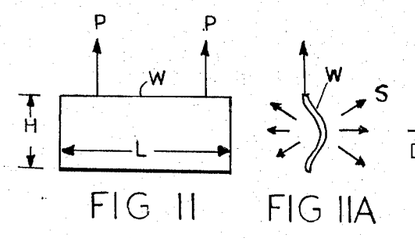
FIG. 11 is a front view of a profile deflection plate.
FIG. 11A is a side view of a profile deflection plate.
Figure 11B:
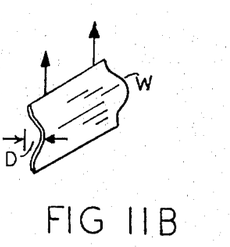
FIG. 11B is a perspective view of a profile deflection plate.

FIGS. 11, 11A and 11B, show views of a simple profile deflection plate W. One cycle of an approximately cosinusoidal shape is shown, but the number of cycles can vary from a fraction of one cycle to N cycles. The profile does not even have to be sinusoidal, any profile shape will induce sound or pressure as it is moved through the water. The profile of a predator fish is not sinusoidal but it causes repelling sound as it moves through the water.

The top and bottom or the leading and trailing edges are thin. The shape of the profile as these edges are approached is parallel to the direction of pull P. Therefore, the leading edge cuts through the water like a knife and the trailing edge causes minimum drag. As the profile deflection plate is pulled through the water, the water on either side is pushed and pulled in accordance with the profile of the plate. Since the height H and depth D can be made quite large the simple deflection plate is well suited as a repulsion driver. It can generate sound in the low frequency range with very large deflection amplitudes commensurate with a large depth D. Since the Length L can also be made quite large the deflection plate performs the function of a large sonic antenna of area H $\times$ L.

Most fish are quite senstive to sound. This defensive mechanism is probably highly sensitive to sounds similar to the sound of predators. The sound does not have to accurately simulate the predator. The bull is attracted to the ruffle of a red cloth and fish are effectively repelled by a tap on the glass wall of a fish tank.

If the height H, the length L and the depth D are similar to the equivalent dimension of a large predator such as a shark and if the pull on the deflection plate is a powerful force at significant velocity, the sound will bear a resemblance to the predator charging at significant speed.

The strong pull required can be supplied by a boat, a motor, a motorized pulley which is powered by water current power or by wave power. When the sonic generator is to be used in an area near waves such as for ocean fish harvesting, very powerful forces are readily harnessed at very low cost from wave power.

The sound pattern is dependent on the velocity at which the deflection plate is pulled. As the velocty goes up, the frequency, the power and the effective range all go up accordingly.

If the pull is supplied by a float at the surface which is raised by a wave, the force will vary with time. The gently rising leading edge of the wave causes a modest pull. Inertia causes the velocity to start increasing slowly. The simple deflection plate is designed to have a thin cross section, a small displacement and therefore a small mass will remain submerged. As the steeper portion of the wave submerges the float, a predetermined maximum pull equal to the full bouyant force of the float is applied to the deflection plate. The low mass deflection plate then accelerates rapidly approaching the maximum instantaneous vertical velocity of the wave. For a particular given deflection plate, the maximum instantaneous velocity generaled determines the maximum instantaneous sonic output power and thus the maximum range. The fish can be repelled by sound which is applied for only a brief instant. This is demonstrated by the effective repelling action caused by the short inpulse as we tap the glass plate of the home aquarium. Thus the effective repelling range can be expected to approach the maximum instantaneous range at which a repelling amplitude is exceeded.

Certain selected profile array combinations of repulsion generators and sound reflectors may cause cancellations at some portions of the sound field and reinforcement at other portions of the sound field pattern. As the instantaneous velocity changes, it causes a changed in the frequency wavelength and effective range. The velocity varies from zero to peak velocity and back to zero for each wave. In addition the wave amplitudes differ from each other. The generated sound pattern varies accordingly. The cancellation and reinforcement area can be expected to be constantly shifting. This causes great probability that during an interval including several waves, at least a portion of one wave period will be either normal power or reinforced power. Conversely, the likelihood of a fish remaining in a cancellation area continuously for the entire interval of several waves is quite small. A brief impulse of sound during the interval can repell the fish.

BIDIRECTIONAL FIELD

The field pattern of the simple profile deflection plate is bidirectional on either side of the plate as shown by the arrows labeled S FIG. 11A for sound. The bidirectional pattern can be used to advantage if the deflection plate sonic driver is located between two traps.

UNIDIRECTIONAL PATTERN FIELD

Figure 12:
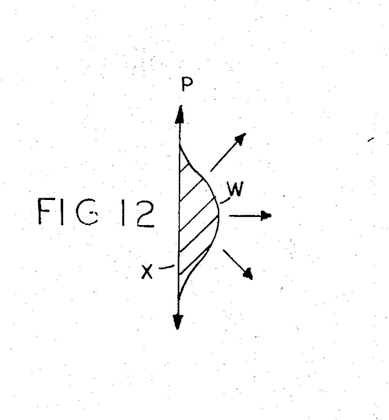
FIG. 12 is a side view of filled volume unidirectional profile deflector plate.

Many applications require a unidirectional field pattern. That is most of the repelling sound is in the forward direction and a minimized sound pattern is in the backward direction. Filling in the area behind the deflection plate as shown, in FIG. 12, as the cross hatched area X, would cause the deflection plate to be unidirectional but would add a large amount of displacement. This limits acceleration peak velocity and effectiveness.

Figure 13:
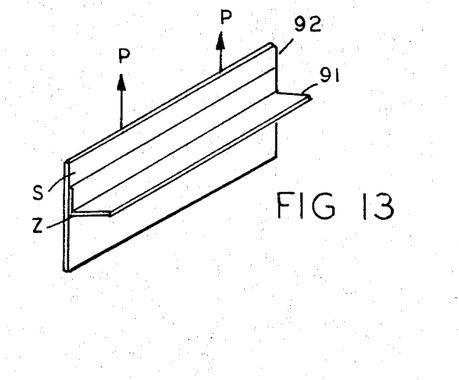
FIG. 13 is a perspective view of a foil and backplate unidirectional profile deflection plate.

FIG. 13 shows a foil and backplate unidirectional profile deflection plate. The foil 91 is attached to the backplate 92 along the surface S. The foil in this case is set at the angle Z to the backplate, but any angle can be used. The surface of the foil extending into the water can be curved and does not have to have a uniform cross section as shown. This particular design is presented for its inexpensive simple design, one bent piece of metal fastened to a flat plate. The displacement is only the volume of the two plates and the field is unidirectional. Inexpensive material and construction requirements make large units possible at low prices.

Figure 14:
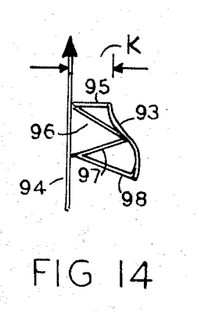
FIG. 14 is a side view and FIG. 14A is a front view of a single profile deflection plate and reflector.
Figure 14A:
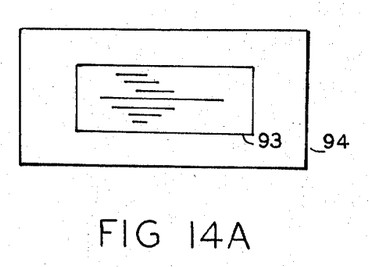

FIGS. 14 and 14A show a simple profile deflection plate 93 mounted to a reflector 94, by struts 95, 96, 97 and 98. The shape of the deflection plate 1 is ½ cycle of a cosine wave. However, a wide variety of deflection surfaces could be used. The function of the deflection plate is the same as previously described and as shown in FIG. 11. Now, however, a half cycle cosine wave shape is shown and the reflector 94 is used to convert the sound field from bidirectional to unidirectional. The backward field from the deflection plate 93 is reflected forward by the reflector 94. As explained previously, the two fields may tend to reinforce each other in some areas and tend to cancel in other areas,, but the combined field can be very effective in repelling fish in the forward direction. The distance K between the deflection pte and the reflector is a major factor in the way the two fields combine. The distance K is set at a value which tends to maximize overall forward repelling effectiveness.

When the profile deflection plates or sonic projectors of FIGS. 11, 11A, 11B, 12, 14 or 14A are used as attraction generators, the dimensions are scaled to provide higher frequency and smaller deflection amplitudes similar to small fish. Larger fish in search of smaller prey will then be attracted. The length L and deflection D is much smaller. The height H is made much smaller or it may include a plurality of cycles in place of the single cycle as shown in FIG. 11 or the ½ cycle as shown in FIG. 14.

Figures 15, 16, 17:
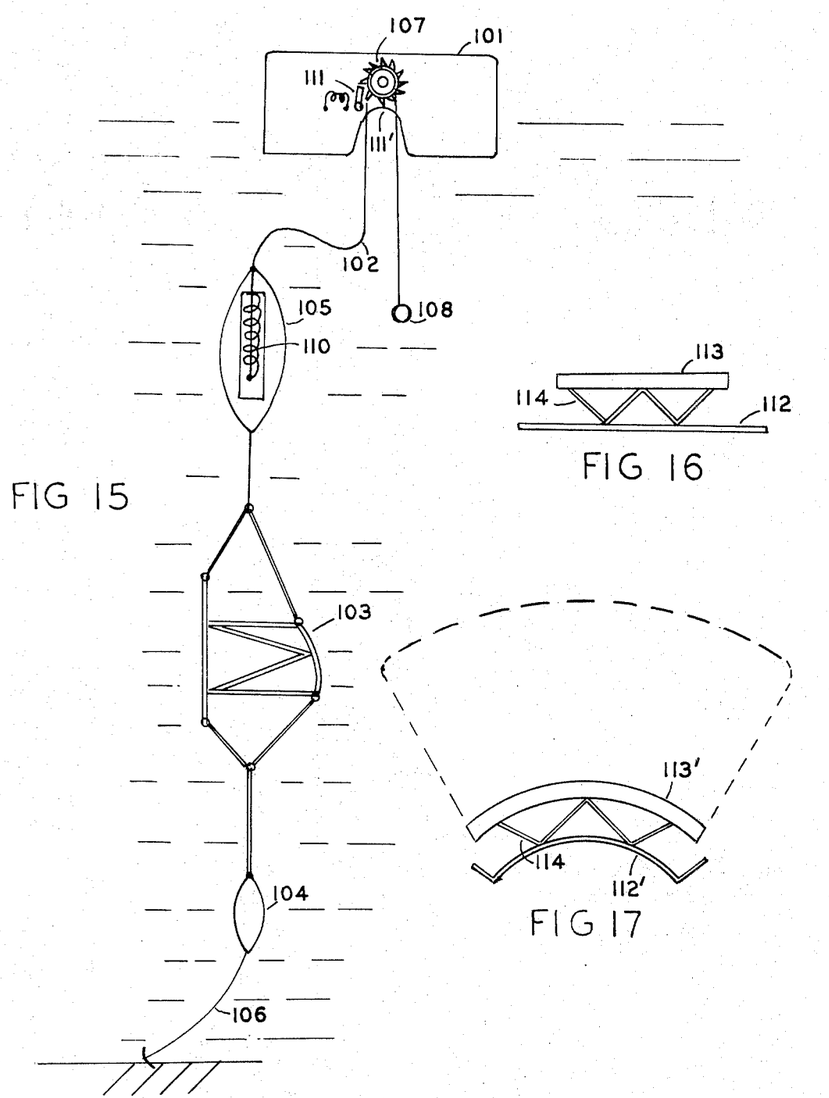
FIG. 15 is a side view of a directional sonic generator connected to wave motor for full cycle of half cycle operation with on-off capability.
FIG. 16 is a simple profile of a deflection plate.
FIG. 17 is a curved profile of a deflection plate.

FIG. 15 shows the deflection plate and reflector type sonic generator of FIG. 14 connected to a simple wave motor. The sonic generator may be an attraction projector or a repulsion driver, a plurality of sonic generators may be connected to a single wave motor by connecting the sonic generators to each other in a series. The cable extending below sonic generator 103 could be connected to the top of the next sonic generator. After connecting a series of cables and sonic generators in this manner, the bottom of the last sonic generator is connected via a cable to weight 104. The connection shown permits two modes of operation, the passive mode and the active mode. In the passive mode, the sonic generator 103 is left in a passive state with only very small unbalance forces placed upon it. In the active mode, wave motion at the surface can cause up to hundreds of pounds of net upward pull as the wave raises float 101 and up to hundreds of pounds of net downward pull as the wave lowers float 101. This forceful upward and downward operation is called full cycle operation. Alternately, using a smaller weight 104 could provide a slow settling drift down as the wave lowers float 101. The forceful upward pull of hundreds of pounds could be maintained during the steep rising portion of a wave. This is called ½ cycle operation.

As shown in FIG. 15 the float 101 is in a down position, after a wave has passed by. There is slack in cable 102, the sonic generator 103 is in a passive state. The balanced group comprising the sonic generator 103, weight 104, balance float 105 and anchor cable 106, are at equilibrium condition. The balance float 105 is holding up the other three members of the balance group.

While there is slack in cable 102, the balance group is in equilibrium condition. As the float 101 is raised by a wave the cable 102 becomes taut, but the electrically operated ratchet wheel 107 has received an electrical release signal and the ratchet wheel 107 is free to turn freely in a CW or CCW direction, the take up weight 108 weights only several pounds. It is small and streamlined with a very low viscous drag. As waves pass, the take up weight 108 is easily pulled up with only a light tension in cable 102. The ratchet wheel 107 is free to rotate and only a small disturbance force can be delivered to the balanced group. This small force is designed to take up slack in cable 102 but it can not cause much movement of the sonic generator 103.

ACTIVE MODE

To switch to the active mode the ratchet wheel 107 receives an electrical latch signal. This signal is generally supplied by a timer. The ratchet wheel 107 when latched by latch 111 permits only CW rotation as shown by the arrow.

Between waves the balance group remains relatively passive. The take up weight 108 pulls on cable 102 turning the ratchet 108 CW and taking up slack in cable 102. As a wave raises float 101, the ratchet wheel 107 prevents CCW rotation and cable 102 pulls up the balance group on one side and the take-up weight on the other side.

The cables and the sonic generator are protected from shock by the shock absorber spring 110 which is either built into float 105 or is rigidly connected to it. Cable 102 pulls on the shock absorber spring 110. As spring 110 deforms, it gradually applies an increasing upward force to float 105. The combination of this spring action and the viscous damping affect of all moving submerged elements provides shock absorbtion. The sonic generator 103 in particular has a large amount of viscous drag to react in combination with spring 110 for shock absorbtion. Therefore, as the wave raises float 101, the balance group is smoothly raised also.

As the wave lowers float 101, the balanced group remains close to equilibrium condition. The bouyant force of the balance float 105 remains the same and the weight of the sonic generator 103 and weight 104 remains the same. Only the vertical component of the long anchor cable 105 has increased by a small amount. When the upward movement of the balanced group is spent in viscous drage, the inertia and viscosity forces of the balance group drop to zero. There is then only the small unbalanced change in the vertical tension of anchor cable 106 to cause a very slow settling of the balance group. The take up weight 108 drops much more rapidly. It does not have a small variation pulling it down. It has its full submerged weight turning wheel 107 CW taking up slack in cable 102 before the balanced group can settle very far. Alternately the cable 102 could circle the ratchet wheel 107 completely and be brought up into the air to a lighter than air balloon. The balloon would supply a small upward force to take up slack in cable 102. In addition the balloon would be a convenient aid to locating the repelling device. Alternately the take up function could be supplied by a small electric motor. Each time a wave passes, float 101 provides a strong upward pull to the balanced group and the take up then removes the slack by additional CW rotation of the ratchet wheel 107. This process continues until the balance float 105 is brought firmly up against the stop ring 111' on float 101. The balance float 105 is then firmly connected to float 101. The two floats act as a single surface float with the combined bouyancy. When a wave raises floats 101 and 105 it can supply a net unbalance upward pull of hundreds of pounds. If the upward pull reached a maximum allowable safe value due to large wave, floats 101 and 105 would both become fully submerged and no additional bouyant force could be supplied by them. As the wave lowers floats 101 and 105, the net downward force supplied by the sonic generator weight 104 and anchor cable 106 pulls the sonic generator down. The submerged weight of the sonic generator 103 and weight 104 can be set at a modest value for a complete downward settling on time for the next wave or it may be set at a downward pull of hundreds of pounds for full cycle operation. The active mode would continue until a release signal is delivered to the ratchet 107. When ratchet 107 is released, it is free to rotate CW or CCw. The balanced group would then slowly drop down to the equilibrium position and the sonic generator would be in the passive mode once more.

The depth of the sonic generator for the active repelling mode can be set at almost any reasonable desired value by adjusting the length of cable 102.

PULL CAPACITY AND SAFETY FACTOR

The pull of the floats 101 and 105 can easily be set at several hundred pounds. The bouyancy of the floats is set at a value which permits the float to be submerged when an assigned maximum safe pull is reached. Once the float is fully submerged it continues to apply the maximum safe pull until the rising float begins to emerge at the surface. The cables and the sound generator are designed to withstand several times the maximum safe pull. Thus the sonic generator could be subjected to extremely high waves.

ESTIMATE OF DELIVERED SONIC ENERGY WHEN USED AS A REPULSION DRIVER

With the balance float 105 rigidly connected to float 101 and floats 101 and 105 acting as a single surface float a pull of several hundred pounds can be applied to cable 102.

Extra submerged weight included in the design of the sonic generator 103 has the same effect as weight 104. Therefore, weight 104 can be eliminated.

For ½ cycle operation the submerged weight of the sonic generator can be set at a modestly small percentage of the peak upward pull applied by cable 112. For a simplified estimate we may calculate the power for a sonic generator being pulled upward at a velocity of 10 MPH and a peak tension in cable 102 which exceeds the submerged weight of the sonic generator by 300 lbs. The peak mechanical horsepower delivered to the sonic generator under these conditions would be approximately:

HP = [1 × 10 mi./hr. × 5280 ft./mi. × 300 lbs.]/[550 × 3600 sec/hr.] = 7.9 = 5.88 kilowatts The efficiency of conversion from mechanical to sonic energy is expected to be fairly high and outputs of several HP or several KW of sonic energy concentrated in the low frequency area can be readily achieved. Much larger sonic generators pulled up by several cables can be made. The free power available from waves has tremendous potential power and it is readily harnessed by low cost floats and cables.

Sound in the low frequency range can travel great distances. Transmission loss is low at these frequencies. The decrease in power due to the inverse square law is accomplished by an increase in the cross sectional area of the sound field. This represents a spreading of the available sonic energy over a broad area. Since the fish are very sensitive to sound, the maximum effective range and cross sectional area will both be quite large.

THE CURVED PROFILE DEFLECTION PLATE

The simple profile deflection plate sonic generators described all have a straight line plan view as shown typically in FIG. 16. Alternately, the plan view could be curved as shown in FIG. 17. The side view cross-sectional profile could be maintained and general operation would remain the same. The added curvature of plate 113' as shown in the plan view of FIG. 17 causes a wide angle field pattern.

The wide angle field pattern is shown as the dashed line in FIG. 17. The field pattern is shaped as shown because the plan view of the sonic generator is arc shaped. A stone dropped in a body of quiet water causes a field of circular ripples. Similarly the arc of the circumference of a circle designed into the sonic generator causes a sound field approximating a portion of a circle. In FIG. 16 the deflector plate 113 is mounted on the reflector plate 112 by struts 114. In FIG. 17 the deflector plate 113' and reflector plate 112' are curved. Alternately, other curves can be used for field pattern shaping instead of this arc shaped plan view.

ALIGNMENT OF SONIC GENERATORS IN AN ARRAY PATTERN

Figures 18, 19:
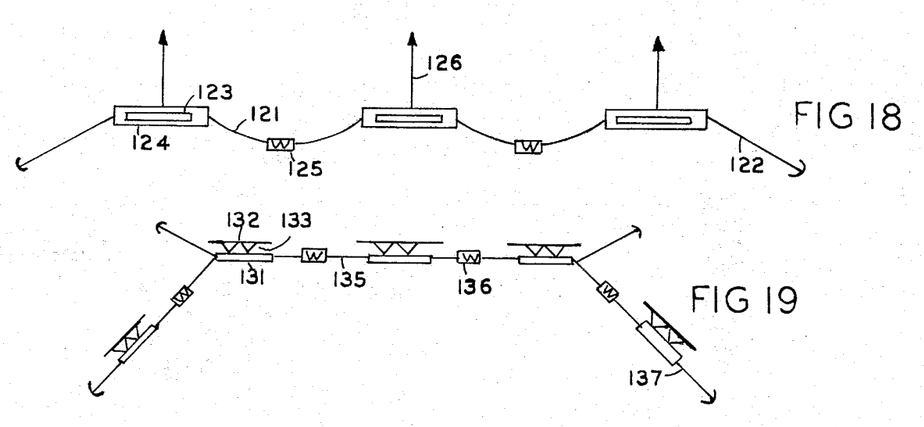
FIG. 18 is a front view of three sonic generators held in alignment between two anchor cables.
FIG. 19 is a plan view of five sonic generators held in 5 × 1 array pattern.

FIG. 18 shows the front view of three sonic generators connected by cables 121 and held in place by anchor cable 122. Each sonic generator is shown symbolically by a profile deflection plate 123 and a reflector 124, a weight 125 applies a modest alignment force. Each of the sonic generators is held up by a cable 126. FIG. 19 is the plan view of five sonic generators held in a 5 × 1 array pattern. The sonic generators 131 are connected to the reflectors 132 by struts 133. They are connected to each other by cables 135 and an alignment force is caused by weights 136. The 5 × 1 array is held in place by four anchor cables 137.

LONG RANGE WAVE OPERATED LIGHT AND SOUND SENSATION GENERATOR

Figure 20:
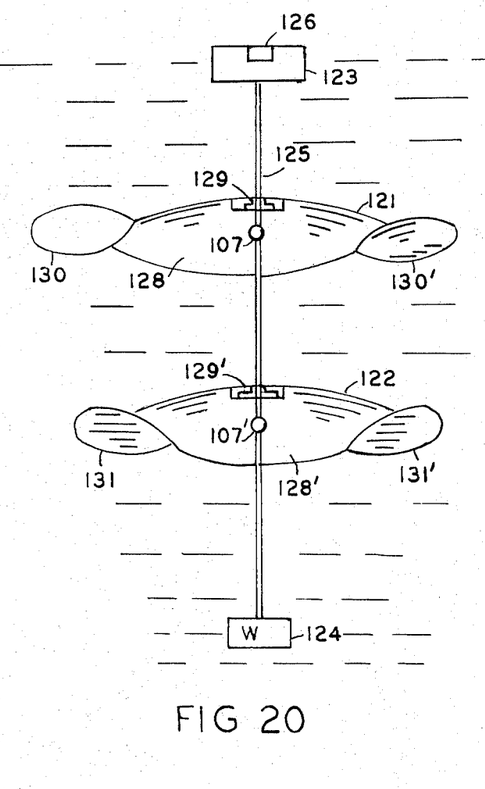
FIG. 20 is a side view of a rotating sensation generator.

FIG. 20 shows a long range wave operated light and sound sensation generator. It can be used to attract or repel fish depending on the variation of design parameters used. Generally, the large size units simulating large predator fish are used for repulsion. A plurality of samll units are used for long range attraction. They attract large fish by simulating a plurality of small fish as sensed from long range.

FUNCTION

The light reflector deflection plates 121 and 122 are suspended between float 123 and weight 124 by cable 125. In addition to providing structural strength as a tension member, cable 125 has the conductors to deliver power from th power supply 126 mounted in float 123 to the lights 107 and 107' mounted on cable 125. Lights 107 and 107' are located within the concave portion of the light reflector deflection plates 121 and 122 but are not physically connected to them. The lights 107 and 107' are insulated and designed to operate in a salt water environment. Therefore, it is not necessary to provide a glass front to the reflector portion of the light reflector deflection plates 121 and 122. The concave reflectors 128 and 128' are open and flooded with water. The light reflector deflection plates 121 and 122 are rotatably mounted on cable 125 by bearings 129 and 129'. Thus the cable 125 and lights 107 and 107' do not rotate as the light reflector deflection plates rotate about them.

Light reflector deflection plate 121 has a pair of foils, 130 and 130' which cause it to rotate quickly as it is pulled through the water by cable 125. Foil 130 is shown without shading because the view is of the top surface which is curved forward towards the viewer and down. Foil 130' is shown shaded because the view is of the bottom surface which is curved forward towards the viewer and up. The pair of foils act as a couple. As cable 125 is pulled up, the combined aiding rotational force of foils 130 and 130' causes a CW rotation as viewed from the top. When cable 125 is pulled down, the direction of rotation is reversed.

Light reflector deflection plate 122 has a pair of foils 131 and 131' which cause it to rotate slowly as it is pulled by cable 125. Foils 131 and 131' are both shown shaded because the view of both is of the bottom surfaces, which are curved forward towards the viewer and up. As cable 125 is pulled up foil 131' causes a CW rotational torque, but foil 131 causes a CCW rotational torque, as viewed from the top. The actual direction of rotation is CCW because foil 131' is slightly more feathered and foil 131 predominates. Alternately, the variation between the torque of foil 131 and 131' could be caused by a size variation. Since foils 131 and 131' are opposed and it is only the difference in their torques which cause a rotation, the net rotation is much slower. The resistance to the pull is larger and the amount of sonic energy caused by the foils is larger.

The concave reflectors 128 and 128' in addition to reflecting light act as a simple profile deflection plate simulating the main body portion of a fish. In addition to causing rotation, the foils 130, 130' and 131 and 131' act as simple profile deflection plates simulating the swing of a fish tail or a fin. Therefore as light reflector deflection plates 121 and 122 are pulled through the water they rotate and project light and sound sensations.

FIELD PATTERN

The sound field pattern is concentrated with two main beams carrying a major portion of the sonic energy. The two beams are each aimed perpendicular to a broadside of the simulated fish. One is aimed forward in the same general directions as the light beam, towards the viewer. The other is aimed backwards into the diagram and away from the viewer. The light is beamed by the concave reflectors 128 and aimed in the forward direction only.

As a reflector-deflection plate rotates, its light and sound field pattern rotate. A fish at any azimuth to the sensation generator would sense a changing pattern of light and sound which would repeat periodically once per rotation. Each rotation will differ because the vertical position is constantly moving as the sonic generator traces out a helical pattern. When the sensation generator is pulled up and down by a wave it rotates CW in one direction and CCW for the return. The light has a fairly high wattage and is concentrated by the reflector. It will look similar to the shiney side of a fish emitting reflected light. It will be orders of magnitude more powerful, however. At long range, it will have a light intensity that is similar to real fish at close range. Rotation will cause the light to appear to go on and off. This will help to attract attention and at slow rotational speeds it will appear like a fish turning its shiney portion into and out of view.

The simulation is not intended to be accurate. Partial simulations can be effective in attracting and repelling fish. In addition, the sensations caused by a plurality of spaced sensation generators will cause a pattern of light and sound simulating a school of fish. In such a pattern, the clutter caused by the group masks imperfections in the simulation of any one sensation generator. When used as an attraction generator, the sensation generator can be effective at long range. They are used to attract a fish from long range to the harvesting area. They are not required to attract fish at close range. At close range, the attraction generator's powerful and concentrated projected sensations could be expected to have a repulsive affect. In addition, a plurality of light reflector deflection plates 121 and 122 can be connected to each cable 125. A plurality of such spaced sensation generators can be wave operated and simulate a school of fish.

Alternately, the light may be omitted. The shaped member will project sensations to attract or repel fish without the aid of the light and reflector.

I claim:

1. Means to herd fish over a variety of prescribed paths including straight paths, turns, transitions and combinations thereof comprising:

an array of directional repelling sound projectors, controlled by a timer sequencer means, said sound projectors arranged in a space pattern and sequenced in a time pattern to direct fish in a given direction, said time pattern and space pattern having a relationship to herd fish and a second array of repelling sound projectors in spaced relation to further direct fish by timed sequential actuation of said repelling sound projector array whereby fish are progressively herded over said prescribed path.

2. A fish repelling device as in claim 1 comprising, a shaped member, means to move said member in water to thereby transmit directional sensations through the water.

3. Apparatus as in claim 2, having a reflector, to cause said repelling sound wave to be propagated in a more directional sound field pattern.

4. Apparatus as in claim 1, having barrier means and directional repelling sound projecting means to direct fish adjacent to said barrier means.

5. Apparatus wherein a barrier and said repelling sound projectors, as in claim 1, provide a transition from one path to another.

6. Means, as in claim 1, comprising said sequenced arrays of directional repelling sound projectors, positioned and directed diagonally towards the bottom and forward along said prescribed path, adapted to herd bottom fish along a prescribed path adjacent to the bottom.

7. Means, as in claim 1, comprising said sequenced arrays of directional repelling sound projectors positioned and directed diagonally towards the surface and forward along said prescribed path, adapted to herd surface fish along a prescribed path adjacent to the surface.

8. Apparatus as in claim 1 further including stationary fish gathering means in combination therewith, whereby said fish gathering means is adapted to accumulate fish.

9. Means as in claim 1 comprising at least one erectable barrier, said sequencer to sequence the operation of said repelling sound projectors to drive fish beyond said barrier while it is in a collapsed condition, sequencing the erection of said barrier and then sequencing other repelling sound projectors to drive said fish adjacent to the erected barrier to further herd fish over said prescribed path.

10. Apparatus as in claim 2, having means to cause said member to rotate.

11. Apparatus as in claim 10, wherein said rotation means comprises foils.

12. Apparatus as in claim 2, having a float connected to said member so that wave motion moves said member in water.

13. Apparatus as in claim 2, having a means to control said motion on and off.

14. Apparatus as in claim 2, having a plurality of said members in a spaced pattern.

15. Apparatus as in claim 14, having means to control the sequence of operation of said members.

16. Means as in claim 1, to herd fish along a prescribed path comprising;
   said sequenced arrays of repelling sound projectors, and means whereby the effectiveness of said directional repelling sound is enhanced by a related array of electrical sensation projectors, having a related timing sequence, said electrical sensations inducing fear, and said repelling sound giving direction.

17. Apparatus, as in claim 10, having a light and means to supply power to said light.

18. Apparatus as in claim 17, having a rotating reflector to cause the reflection of said light to rotate.

* * * * *